April 3, 1951 L. SAIVES 2,547,784
STEERING GEAR ADJUSTING DEVICE FOR MOTOR VEHICLES
Filed July 30, 1947
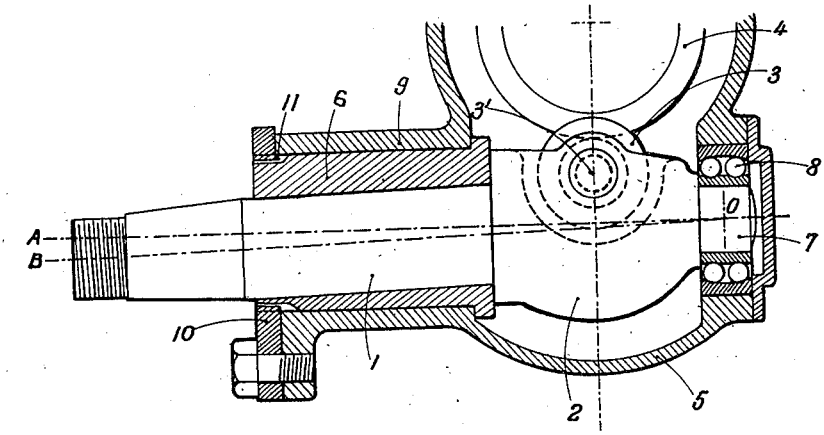
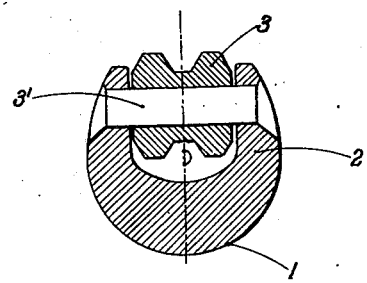
INVENTOR
LÉON SAIVES
BY
Robert E. Burns
ATTORNEY Patented Apr. 3, 1951

2,547,784

UNITED STATES PATENT OFFICE 2,547,784

STEERING GEAR ADJUSTING DEVICE FOR MOTOR VEHICLES

Léon Saives, Billancourt, France, assignor to Regie Nationale des Usines Renault, Billancourt, France Application July 30, 1947, Serial No. 764,889
In France January 9, 1940

Section 1, Public Law 690, August 8, 1946
Patent expires January 9, 1960

2 Claims. (Cl. 74—497)

This invention relates to a steering gear adjusting device for motor vehicles.

In the present art, it is known to construct the steering gear adjusting device by varying the inter-axial distance between the worm and the roller-carrying lever, or between the worm and the segment, by the use of eccentric bushes serving as bearings for the segment-carrying shaft or roller-carrying shaft, on which is mounted the steering lever.

In most cases, the segment or roller carrier is mounted in overhung fashion, and therefore requires only one eccentric bush for the inter-axial adjustment.

In the case, however, of heavy vehicles, for example, when it is desired to support the segment or roller carrier on both sides and when the adjustment is effected by eccentricity, it is necessary to provide two eccentric bushes, the adjustment of which is effected simultaneously or individually. In the device according to the invention, the roller-carrying shaft is supported at both ends and comprises only one eccentric bush for its adjustment.

To make the invention well understood, it will be described more particularly with reference to the accompanying drawing, which shows a form of construction by way of example which is not restrictive.

Figure 1 is a longitudinal section, and

Figure 2 a cross-section through the double roller.

The roller-carrying shaft or lever 1 is provided with a fork-shaped part 2, the arms of which support a pin $3^1$ on which rotates a double roller 3 always in engagement with a worm 4 integral in rotation with the steering wheel.

The shaft 1 is supported in the casing 5 at one end by an eccentric bush 6 and beyond its fork-shaped part 2, that is to say at its other end 7 by a bearing 8, preferably a ball bearing, mounted for swivelling.

The eccentric bush 6 possesses the following feature: its internal bore, instead of being parallel, while being eccentric, at the external bearing 9 of the casing 5 is inclined in such a manner that its axis OB passes through the centre of the swivel bearing 8; the external surface of said bush 6 is machined along the axis OA which coincides with that of the bearing 9 and consequently with that of the casing 5.

By rotating the bush 6 in the bearing 9 of the casing 5, it is therefore possible to bring the double roller 3 into perfect contact with the worm 4. The displacement of the bearing due to the slight variation in inclination of the roller-carrying pin relatively to the plane perpendicular to the axis of the worm is absolutely negligible.

The eccentric bush 6 will be made integral with a plate 10 by means of notches 11 or any other means. By means of the plate 10, the bush 6 will be rotated for effecting the adjustment, and the latter being effected, the plate 10 and consequently the bush 6 will be fixed in position on the casing 5 by a bolt.

The connection of the eccentric bush 6 with the plate 10, and its fixing means are given solely by way of example, and may be replaced by any suitable means.

I claim:

1. A device for the adjustment of the steering gear of motor vehicles, comprising a worm, a roller member disposed to be rotated by said worm, a shaft rotatably supporting said roller member, a swivel bearing supporting one end of said shaft, a bushing supporting the other end of said shaft, and a housing for supporting at least said bearing and said bushing, the outside of said bushing and the inside of the housing portion supporting said bushing having a first axis at right angles to the line connecting the axes of rotation of said worm and of said roller, and the axis of the portion of the shaft bearing on the inside of said bushing as well as the inside of said bushing having an axis forming an angle with said first named axis and intersecting therewith substantially at the center of rotation of said swivel.

2. A device according to claim 1, further including means for locking said bushing in a given rotary position with respect to said housing adjacent said other end of the shaft.

LÉON SAIVES.

REFERENCES CITED

The following references are of record in the file of this patent:

UNITED STATES PATENTS

| Number | Name | Date |
|---|---|---|
| 1,443,685 | Huff | Jan. 30, 1923 |
| 1,538,497 | Anibal | May 19, 1925 |

FOREIGN PATENTS

| Number | Country | Date |
|---|---|---|
| 156,972 | Great Britain | Jan. 20, 1921 |